3,340,240
POLYMERIZATION OF UNSATURATED HYDRO-
CARBON MONOMERS IN THE PRESENCE OF A
NON - HALOGENATED ANIONIC COORDINA-
TION TYPE CATALYST AND TETRACHLORO-
ETHYLENE
Giulio Natta, Giorgio Mazzanti, Alberto Valvassori, and
Guido Sartori, Milan, Italy, assignors to Montecatini
Edison S.p.A., Milan, Italy, a corporation of Italy
No Drawing. Filed May 21, 1963, Ser. No. 282,168
Claims priority, application Italy, May 22, 1962,
10,271/62
13 Claims. (Cl. 260—88.2)

This invention relates to a process for the preparation of substantially linear, high-molecular weight, homopolymers or copolymers of unsaturated hydrocarbon monomers. More specifically, this invention relates to a process for the preparation of linear head-to-tail high-molecular weight homopolymers of alpha-olefins and copolymers of said alpha-olefins with each other and/or with ethylene. These alpha-olefins have the general formula $$R—CH=CH_2$$

wherein R is an alkyl group containing from 1 to 6 carbon atoms. Further, this invention is directed to copolymers of one or more monomers selected from the group consisting of ethylene and a higher alpha-olefin with one or more monomers selected from the group consisting of conjugated and non-conjugated linear or cyclic dienes, polyenes, alkenyl cycloalkenes, dialkenylcycloalkanes, polyalkenylcycloalkanes, and the dienes or polyenes containing silicon.

Heretofore, these linear, high-molecular weight homopolymers or copolymers were prepared with catalysts consisting essentially of the reaction products between:

(1) An organometallic compound of the elements belonging to the first, second and third groups of the Periodic Table; and (2) A compound of the transition metals belonging to the fourth, fifth and sixth groups of the Periodic Table.

The homo or copolymerization reaction was carried out in the presence of either a hydrocarbon solvent which was inert with respect to the monomers to be polymerized or by using one or more of the monomers in the liquid state. Except for the homopolymerization of ethylene and butadiene in the homopolymerization of a higher alpha-olefin or in the copolymerization of one or more of the higher alpha-olefins, it was found necessary, in order to obtain satisfactory yields, to use a catalyst which contained a halogen atom.

The difficulty of obtaining satisfactory yields of ethylene and propylene copolymers with catalytic systems of triethyl aluminum and VO(O—i-C$_4$H$_9$)$_3$ has been disclosed in a report by G. Bier (Angew. Chemie 73 (1961) 186–197). Natta et al. in J. Polymer Science 51, 411 (1961) also discloses that by using a catalyst comprising vanadium triacetylacetonate or vanadyl diacetylacetonate and triethyl aluminum only traces of an ethylene-propylene copolymer could be obtained. It was also disclosed by G. Bier and by Natta et al. that by substituting one or both of the catalyst components with a halogen-containing compound, the ethylene-propylene copolymerization reaction would take place with fairly good yields.

Thus, in accordance with this invention, it has been discovered that homopolymers of a higher alpha-olefin and copolymers of said alpha-olefins with each other and/or with ethylene can be obtained in satisfactory yields by using a catalytic system comprising (1) a halogen-free compound of the transition metals belonging to the 5th and 6th groups of the Periodic Table and (2) a halogen-free organometallic compound of the metals belonging to the 1st and 2nd and 3rd groups of the Periodic Table. Of the transition metals belonging to the 5th and 6th groups the vanadium and chromium compounds are preferred. Further, in place of the organometallic compounds of the metals belonging to the 1st, 2nd and 3rd groups, halogen-free organometallic complexes of the metals belonging to the 1st and 3rd groups may be used in combination with the halogen-free compounds of the transition metals.

In addition to the above homo and copolymers of ethylene and the alpha-olefins or mixtures thereof, copolymers of monomers selected from the group consisting of (A) ethylene, (B) higher alpha-olefins, and (C) one or more monomers selected from the group consisting of conjugated and unconjugated linear or cyclic polyenes, dienes, alkenylcycloalkenes, dialkenylcycloalkanes, polyalkenylcycloalkanes, and the dienes or polyenes containing silicon can be prepared with the above-mentioned catalytic systems. It is important to note, however, that the advantages referred to are obtained by carrying out the catalyst's preparation and/or the polymerization reaction in the presence of a halogen-containing hydrocarbon. This result was quite unexpected in that ordinarily the halogen-containing hydrocarbon would inactivate the above-mentioned catalyst by interreacting with the catalyst components i.e. the organometallic compounds.

Typical but non-limiting examples of the halogen-containing hydrocarbons which can be used in this invention include chloroform, methylene chloride, trichloroethylene, tetrachloroethylene, and mixtures thereof. The best results are however obtained by employing tetrachloroethylene.

The organometallic compounds used for the preparation of the catalyst include preferably beryllium dialkyls, magnesium dialkyls, zinc dialkyls, cadmium dialkyls, aluminum trialkyls, lithium-aluminum tetralkyls, aluminum alkenyls, aluminum alkylenes, aluminum alkoxy alkyls, aluminum alkylacylacetonates, aluminum cycloalkyls, aluminum cycloalkylalkyls, aluminum aryls, aluminum alkyl-aryls, complexes of these organometallic compounds with weak Lewis' bases. Additional examples of the organometallic compounds include beryllium diethyl, magnesium diethyl, zinc diethyl, zinc dibutyl, cadmium diethyl, aluminum trimethyl, aluminumtriethyl, aluminum triisobutyl, aluminum trihexyl, aluminum trioctyl, aluminum butenyl-diethyl, aluminum isohexenyldiethyl, 2-methyl-1, 4-di(diisobutylaluminum) butane, aluminum tricyclopentylmethyl, aluminum tri(diethylcyclopentylmethyl), aluminum triphenyl, aluminum tritolyl, aluminum diethyl-monoethoxide, aluminum diisobutylisopropoxide, aluminum diethylmonoacetylacetonate.

The organic compounds of the transition metals which can be used for purposes of this invention belong to groups V and VI of the Periodic Table and include vanadium or chromium acetylacetonates, vanadyl diacetonates, vanadyl trialcoholates, alkyl orthovanadates, and other vanadium organic salts. Additional typical examples include vanadium acetylacetonate, vanadium benzoylacetonate, vanadyl diacetylacetonate, vanadyl triisopropylate, chromium acetylacetonate, chromium benzoylacetonate, ethyl, propyl, butyl, tert.butyl, 2-ethylhexyl orthovanadates, vanadium triacetate, tribenzoate, and tristearate. Of the above mentioned compounds, the vanadium compounds were found to be particularly satisfactory in the preparation of the catalyst for purposes of this invention.

The alpha-olefins to be used in the homo or copolymerization process in accordance with this invention are characterized by the general formula R—CH=CH$_2$ wherein R is an alkyl group with 1–6 carbon atoms. It was found that when ethylene was copolymerized with any of the higher alpha-olefins, particularly good results were obtained by using ethylene with propylene and/or butene.

The monomeric mixtures to be copolymerized, may include ethylene and/or any one of the higher alpha-olefins with at least one monomer selected from the groups consisting of:

(a) Conjugated linear-dienes such as, for example, butadiene-1,3; isoprene; pentadiene-1,3; hexadiene-1,3; heptadiene-1,3; and 6-methylheptadiene-1,3 etc.

(b) Conjugated cyclic dienes such as, for example, cyclopentadiene-1,3; and methylcyclopentadiene-1,3.

(c) Non-conjugated linear dienes such as pentadiene-1,4; hexadiene-1,5; hexadiene-1,4; 2-methyl-pentadiene-1,4; 2-methyl-hexadiene-1,5; 2-phenyl-hexadiene-1,5; heptadiene-1,5; 2-methyl-heptadiene-1,6; heptadiene-1,6; octadiene-1,5 and 2,6-dimethyloctadiene-1,7.

(d) Non-conjugated cyclic dienes or polyenes such as cycloheptadiene-1,4; cyclooctadiene-1,5; cyclooctadiene-1,4; cyclodecadiene-1,6; cyclodecadiene-1,5; cyclododecadiene-1,7; cyclododecatriene-1,5,9; 1-methylcyclooctadiene-1,5; 3-methylcyclooctadiene-1,5 and 3,4-dimethylcyclooctadiene-1,5.

(e) Polycyclic dienes, with endomethylenic structures such as bicyclopentadiene; bicyclo(2,2,1)heptadiene-2,5; 2-methylenebicyclo(2,2,1)heptene-5.

(f) Alkenylcycloalkenes such as 1-vinylcyclohexene-1; 4 - vinylcyclohexene - 1; 1-hexene-5-yl-cyclohexene-1; 3-methyl-4 - allyl - cyclohexene-1; 1-buten-3-yl-cyclohexene-1; 1-allyl-cyclohexene-1; 3-buten-3-yl-cyclo-pentene-1; 1-penten-4-yl-cyclopentene-1; 3-methyl-1-buten - 3 - yl-cyclopentene-1 and 2,3,3-trimethyl-4-vinyl-cyclopentene-1.

(g) Dialkenyl- or polyalkenyl-cycloalkanes such as trans-1,2-divinylcyclobutane; cis - 1,2-divinylcyclobutane; 1,2-divinylcyclopentane; trans-divinylcyclopropane; 1,2-divinylcyclohexane; trivinylcyclohexanes; diallylcyclohexane and 1-vinyl-2-isopropenylcyclobutane.

(h) Dienes or polyenes containing silicon such as dimethyldivinylsilane; dimethyldiallylsilane; tetravinylsilane; tetraallylsilane; diphenyldiallylsilane; ethyldiallylsilane; diallyldiisopropylsilane and diallyl-di-sec.-butyl-silane.

The polymerization process of this invention can be carried out at temperatures ranging from about —80° to +125° C. but more preferably at a range between —50 and +50° C.

Polymerization may be carried out in various ways, for example by mixing the organometallic compound and the transition metal compound in presence of the halogen-containing hydrocarbon, and mixing the whole with the monomer or monomers to be polymerized, in the presence of an inert hydrocarbon solvent. Alternatively, the organometallic compound and the transition metal compound may be mixed up in presence of an inert hydrocarbon solvent; then the mixture is put in contact with the monomer or monomers to be polymerized, in the presence of the halogen-containing hydrocarbon. Still another alternative, is to carry out the reaction between the organometallic compound and the transition metal compound in presence of the monomer and the halogen containing hydrocarbon. The polymerization can be carried out continuously, by periodically or continuously supplying quantities of the catalyst and/or monomer to the system.

If the copolymers obtained from the copolymerization are to have a high-degree of homogeneity, it is advisable to maintain constant or as constant as possible the ratio of the monomers in the liquid phase. To accomplish this, it is advisable to copolymerize the monomers in a continuous manner by continuously feeding and discharging a monomeric mixture having a constant composition and operating at high spacial speed. On the other hand, if the copolymerization is to include ethylene, it is generally necessary, if amorphous products are desired, to maintain the ethylene content in the raw copolymer at approximately 70 mole percent or less. At these percentages, the product is amorphous and is completely soluble in boiling n-heptane.

Likewise, if amorphous copolymers are to be obtained by the copolymerization of a diene or polyene with a mixture of ethylene and propylene, it is important to keep the molar ratio of the ethylene to propylene, in the liquid phase, at about 1 to 4 or less. This ratio corresponds to a molar ratio of ethylene to propylene, under normal conditions in a gaseous phase of about 1:1. If, however, butene-1 is to be used in place of the propylene mentioned above, then the ratio between the ethylene and the butene-1 should be lower or at a maximum of about 1:20. This corresponds to a molar ratio of ethylene to butene-1 under normal conditions in a gaseous phase of about 1:1.5.

Generally, it is advisable, mainly because of economic reasons, to introduce into the copolymer 20% or less of the diene or polyene. In considering this, however, it is possible to vary, within large limits, the copolymer composition by varying the composition of the monomeric mixture.

The crystalline olefinic homopolymers of this invention are of particular interest in that they may be used in the field of plastics for the preparation of shaped articles, sheets, plates, films, fibers, etc. If, however, the products are amorphous, they may be used for the preparation of adhesives, inks, and other forms of coatings where polymeric materials are used as films. The ethylene copolymers with one or more of the higher alpha-olefins and particularly the amorphous copolymers have wide utility as elastomers and can be used, after being vulcanized with the proper vulcanizing compounds, for various purposes. In addition, the amorphous ethylene and/or alpha-olefin copolymers with one or more dienes or polyenes may be used satisfactorily as elastomers.

The following examples are given as a means of illustrating the various aspects of the invention but not intended to be limited thereto.

*Example 1*

Into a glass test tube, having the capacity of 100 cm.$^3$, previously deaerated and plunged into a thermostatic bath kept at —20° C., 50 cm.$^3$ of anhydrous tetrachloroethylene was introduced, together with 2.8 millimoles of diethyl orthovanadate and 14 millimoles of triethyl aluminum.

Propylene was circulated through the mixture, until the liquid volume was increased by 10 cm.$^3$. The mixture was left for 8 hours at the temperature of —20° C. The reaction was interrupted by adding methanol. The reacting mass was purified by placing it into a separating funnel, first with diluted hydrochloric acid and then with water. It was then mixed with an excess of acetone. After vacuum drying, 1.9 g. of polypropylene was obtained, having an intrinsic viscosity measured in tetralyne at 135° C. to equal 1.2.

The polymer obtained was mainly amorphous, as indicated by X-ray examination and showed only a weak crystallinity of the isotactic type.

*Example 2*

Into a 100 cm.$^3$ glass test tube, previously deaerated and plunged into a thermostatic bath at —20° C., 2.8 millimoles of vanadium triacetylacetonate, 50 cm.$^3$ of anhydrous tetrachloroethylene and 14 millimoles of triethyl aluminum were introduced. Propylene was circulated through the mixture, until the liquid volume was increased by 10 cm.$^3$. The mixture was left resting for 8 hours, then the reaction was interrupted by the addition of methanol. The product was purified and isolated, as described in Example 1. Approximately 1.1 g. of polypropylene was obtained, which had properties similar to that described in Example 1. By substituting n-heptane for tetrachloroethylene no polymer was formed.

Example 3

The reaction apparatus comprised a glass cylinder provided with a stirrer and tubes for gas inlet and outlet. The gas inlet tube reached the cylinder bottom and had a porous diaphragm end. Into the reaction apparatus, which was kept under nitrogen atmosphere and plunged into the thermostatic bath at −20° C., was introduced 200 cm.³ of anhydrous tetrachloroethylene. A gaseous propylene-ethylene mixture, in a molar ratio of 4:1 was introduced and circulated at a rate of 200 N liters/hour. The catalyst was pre-formed at −20° C. in a 100 cm.³ flask under nitrogen by reacting 50 cm.³ of anhydrous tetrachloroethylene, 2.8 millimoles of ethyl orthovanadate and 14 millimoles of triethyl aluminum.

The catalyst thus prepared was kept at −20° C. for 1 minute, and then siphoned into the reactor with nitrogen pressure. The gaseous ethylene-propylene mixture was continuously fed and discharged at a space velocity of 200 N liters/hour. About 17 minutes after the catalyst introduction, the reaction was interrupted by the addition of methanol.

The reaction product was purified and separated as described in Example 1. After drying, 3.9 g. of solid white ethylene-propylene copolymer were obtained, which was completely soluble in boiling n-heptane and had the appearance of a non-vulcanized elastomer. X-ray examination showed that the product was amorphous and that the absorption maximum shifted as compared with that of the amorphous polypropylene. Infrared spectrography examination showed the presence of methylenic sequences, giving bands between 13.4 and 13.8 microns. A propylene content of 57% by weight may be calculated from the infrared spectrum.

Example 4

In the reaction apparatus described in Example 3, kept under nitrogen and plunged into a thermostatic bath at −20° C., 200 cm.³ of anhydrous tetrachloroethylene was introduced. A gaseous ethylene-propylene mixture was introduced, in the molar ratio of 1:4, and circulated at a rate of 200 N liters/hour. The catalyst was pre-formed, under nitrogen at −20° C., by reacting 50 cm.³ of anhydrous tetrachloroethylene, 2.8 millimoles of vanadium triacetylacetonate and 14 millimoles of triethyl aluminum. The catalyst thus preformed was siphoned into the reactor by nitrogen pressure. The gaseous ethylene-proylene mixture was continuously introduced and discharged at a velocity of 200 N liters/hour. About 25 minutes after the catalyst addition, the reaction was interrupted by adding methanol.

The reaction product was purified and separated as described in Example 1. After vacuum drying, 2.1 g. of solid, white ethylene-propylene copolymer were obtained. This product was completely extractable with boiling n-heptane, and had the appearance of a non-vulcanized elastomer. The X-ray examination showed that the product was amorphous and that the absorption shifted as compared with that of amorphous polypropylene. The infrared spectrography examination showed the presence of methylenic sequences, giving bands from 13.4 to 13.8 microns.

A propylene content of 57% in weight may be calculated from the infrared spectrum. By substituting n-heptane for tetrachloroethylene no copolymer was formed.

Example 5

In the reaction apparatus described in Example 3, kept under nirogen and plunged into a thermostatic bath at 25° C., 200 cm.³ of anhydrous tetrachloroethylene were introduced. A gaseous ethylene-propylene mixture in the molar ratio of 1:4 was introduced and circulated at a space velocity of 200 N liters/hour. The catalyst was pre-formed at 25° C., under nitrogen, by reacting 50 cm.³ of anhydrous tetrachloroethylene, 2.8 millimoles of ethyl orthovanadate and 14 millimoles of triethyl aluminum. The catalyst thus pre-formed was kept for 1 minute at 25° C. and then siphoned into the reactor by nitrogen pressure. The gaseous ethylene-propylene mixture was continuously fed and discharged at a space velocity of 400 N liters/hour.

About 5 minutes after the catalyst introduction, the reaction was interrupted by adding methanol. The reaction product was purified and separated as described in Example 1. After vacuum drying, 4.5 g. of solid, white ethylene-propylene copolymer were obtained. This product was completely extractable with boiling n-heptane and had the appearance of a non-vulcanized elastomer. X-ray examination showed that the product was amorphous and that the absorption maximum shifted as compared with that of amorphous polypropylene. Infrared spectrographic examination showed the presence of methylanic sequences, giving bands between 13.4 and 13.8 microns.

Example 6

In the reaction apparatus described in Example 3, kept under nitrogen and plunged into a thermostatic bath at −20° C., 200 cm.³ of anhydrous tetrachloroethylene and 15 cm.³ of 2-methyl-pentadiene-1,4 were introduced. A gaseous propylene-ethylene mixture in the molar ratio of 4:1 was introduced and circulated at a space velocity of 200 N liters/hour. The catalyst was preformed at −20° C. under nitrogen in a 100 cm.³ flask, by reacting 50 cm.³ of anhydrous tetrachloroethylene, 2.8 millimoles of ethyl orthovanadate and 14 millimoles of triethyl aluminum. The catalyst thus prepared was kept at −20° C. for 1 minute, and then siphoned into the reactor with nitrogen pressure. The gaseous ethylene-propylene mixture was continuously fed and discharged at a spacial velocity of 200 N liters/hour. About 35 minutes after the catalyst introduction, the reaction was interrupted by adding 20 cm.³ of methanol, containing 0.2 g. of phenyl-beta-naphthylamine. The product was purified and separated, under nitrogen atmosphere, as described in Example 1.

After vacuum drying, 2.4 g. of solid, white product were obtained. This product was completely soluble in boiling heptane, and had the appearance of a non-vulcanized elastomer.

X-ray examination showed that the product was amorphous. Infrared spectrography examination showed the presence of bands at 11.2 microns, indicating the presence of vinyldenic type double bonds.

100 parts by weight of the ethylene-propylene-methylpentadiene terpolymer were mixed, in a laboratory roll mixer, with one part of phenyl-beta-naphthylamine, 5 parts of zinc oxide, 2 parts of sulphur, 1 part of tetramethylthiuramdisulphide, 0.5 part of mercaptobenzothiazole. The mixture was vulcanized in a press for 30 minutes at 150° C. From the vulcanized plate, test pieces were obtained for ASTM D412–51T test which gave the following values:

Tensile stress _____ kg./cm.² __ 33
Elongation at break _____ percent __ 650
Modulus at 300% _____ kg./cm.² __ 13
Permanent elongation at break _____ percent __ 16

The same run carried out without tetrachloroethylene in the presence of n-heptane as solvent gave no copolymer.

Although the invention has been described in detail with reference to specific embodiments, it is to be understood that the invention is not to be limited thereto and that other modifications may be used which come within the scope of the invention as more particularly pointed out in the claims.

What is claimed is:
1. A process for preparing high molecular weight:
    (a) homopolymers of alpha-olefins having 3 to 8 carbon atoms;
    (b) copolymers of alpha-olefins having 2 to 8 carbon atoms with each other;

(c) copolymers of the alpha-olefins in (b), with hydrocarbon compounds selected from the group consisting of dienes and polyenes, comprising, polymerizing at least one of said monomers in the presence of a catalyst system consisting essentially of (1) a halogen-free transition metal compound selected from the group consisting of chromium acetylacetonate, vanadium acetylacetonate, vanadyl diacetylacetonate, vanadyl trialcoholates, alkyl orthovanadates, vanadyl benzoyl-acetonate, vanadyl triisopropylate, chromium benzyol-acetonate, vanadium triacetate, vanadium tribenzoate, and vanadium tri-stearate; (2) a halogen-free organometallic compound of the metal of Groups I, II, and III of the Periodic Table, the catalyst preparation and polymerization taking place in the presence of tetrachloroethylene.

2. The method of claim 1, further characterized in that a homopolymer is formed from an alpha-olefin having from 3 to 8 carbon atoms.

3. The method of claim 1, further characterized in that a copolymer is formed from at least 2 alpha-olefin monomers having from 2 to 8 carbon atoms.

4. The method of claim 1, further characterized in that a copolymer is formed from at least one alpha-olefin monomer having from 2 to 8 carbon atoms, with a hydrocarbon monomer selected from the group consisting of dienes and polyenes.

5. The method of claim 1, further characterized in that the vanadium compound is selected from the group consisting of vanadyl diacetylacetonate and vanadium triacetylacetonate.

6. The method of claim 1, further characterized in that the polymerization is carried out at a temperature ranging from about −80° C. to +125° C.

7. The method of claim 1, further characterized in that the organometallic compound is an organic aluminum compound.

8. The method of claim 2, further characterized in that propylene is polymerized to polypropylene.

9. The method of claim 3, further characterized in that the monomer mixture is a mixture of ethylene and propylene.

10. The method of claim 1, further characterized in that the vanadium compound is selected from the group consisting of triethyl orthovanadate and vanadium triacetylacetonate, the aluminum compound is triethyl aluminum.

11. The method of claim 10, further characterized in that propylene is polymerized to polypropylene.

12. The method of claim 10, further characterized in that the monomer mixture is a mixture of ethylene and propylene.

13. The method of claim 10, in which a terpolymer is formed.

References Cited

UNITED STATES PATENTS

| | | | |
|---|---|---|---|
| 2,933,480 | 4/1960 | Gresham et al. | 260—80.5 |
| 2,985,640 | 5/1961 | Loeb | 260—94.9 |
| 3,051,690 | 8/1962 | Vandenberg | 260—88.2 |
| 3,162,620 | 12/1964 | Gladding | 260—80.5 |
| 3,166,517 | 1/1965 | Ro | 260—80.5 |
| 3,166,538 | 1/1965 | Olson et al. | 260—88.2 |

JOSEPH L. SCHOFER, *Primary Examiner.*

JAMES A. SEIDLECK, *Examiner.*

W. HOOVER, *Assistant Examiner.*